United States Patent [19]

Provine

[11] 4,291,308
[45] Sep. 22, 1981

[54] NON-LINEAR RASTER GENERATOR

[75] Inventor: Daniel J. Provine, Severna Park, Md.

[73] Assignee: Westinghouse Electric Corp., Pittsburgh, Pa.

[21] Appl. No.: 44,616

[22] Filed: Jun. 1, 1979

[51] Int. Cl.³ .............................................. G01S 13/89
[52] U.S. Cl. .................................. 343/5 SC; 340/744; 343/5 CM
[58] Field of Search ................. 343/5 R, 5 CM, 5 SC; 340/723, 744, 747

[56] References Cited

U.S. PATENT DOCUMENTS

| 3,418,459 | 12/1968 | Purdy et al. | 340/744 X |
| 3,653,044 | 3/1972 | Breeze et al. | 343/5 SC |
| 3,778,821 | 12/1973 | Young | 343/5 R |
| 3,988,731 | 10/1976 | Young | 343/5 SC X |

Primary Examiner—T. H. Tubbesing
Attorney, Agent, or Firm—J. B Hinson

[57] ABSTRACT

A display system utilizing a non-linear raster generator is disclosed. As is conventional in raster scan displays, the scanning is controlled by two electrical signals arbitrarily designated the X and Y deflection signals. In the preferred embodiment, two memories are used to store signals which provide constants to control the amount of the non-linearity of the raster. These constants are processed to generate X and Y deflection signals which are generally hyperbolic in nature. This type of display is particularly useful for displaying mapping signals produced from airborne doppler radar.

4 Claims, 2 Drawing Figures

NON-LINEAR RASTER GENERATOR

BACKGROUND OF THE INVENTION

1. Field of the Invention

The invention relates to display systems and in the preferred embodiment to a display system for displaying ground maps produced by utilizing doppler radar video signals.

2. Description of the Prior Art

The azimuth resolution of real beam radar systems is determined by the antenna beamwidth. To overcome this limitation the frequency shift (doppler effect) that occurs between the transmitter and the target due to their relative velocity is used to sort out targets inside the beam. Every point on the ground can be defined by an airborne ground map doppler radar system by its range and doppler frequency. Range is necessary because a given doppler frequency defines a locus of points that make up a hyperbola that is called "isodop" or a line of constant doppler frequency. The range dimension then defines a point along any isodop. Therefore, doppler radar systems that process all ranges of interest from the return for any given output pulse at a given doppler frequency can only map along a single isodop. To scan an area on the ground requires processing a number of returns at different doppler frequencies.

The usual ground map display system works on true azimuth and range outputs from a radar. If this approach is used to display video from the doppler radar system, severe distortion of the map occurs. The system which is the subject of this invention, overcomes this display problem by generating a non-linear raster which has the same basic geometrical form as the isodops.

SUMMARY OF THE INVENTION

The disclosed invention comprises a system for displaying video signals using a non-linear raster. First and second memories are used to store parameters supplied by the associated doppler radar system. These parameters are read in a predetermined sequence and used to calculate non-linear x and y deflection signals for a CRT display. The x and y deflection signals and a video signal from the doppler radar system are coupled to the CRT display to generate a non-linear raster display system.

DESCRIPTION OF THE PREFERRED EMBODIMENT

Figure 1:
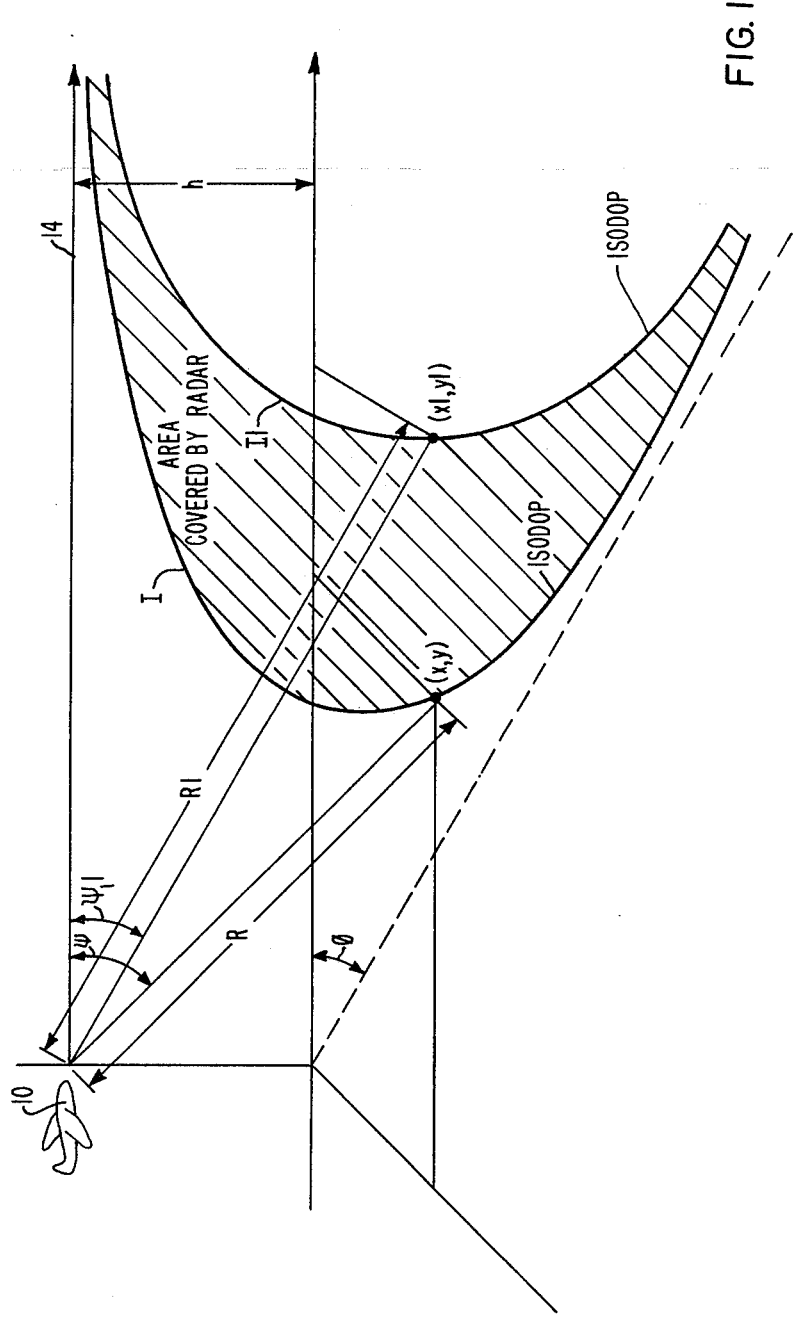
FIG. 1 is a diagram illustrating the geometrical considerations involved in using doppler radar for ground mapping.

FIG. 1 is a diagram illustrating the geometrical considerations involved in ground mapping using airborne doppler radar. For purposes of illustration it is assumed that an aircraft 10 is flying at a constant altitude (h). The doppler radar projects a radar beam toward the surface of the earth to be mapped. In normal circumstances, the beam can be scanned to the left and the right of the forward velocity vector 14 of the aircraft 10. This permits the radar to distinguish between targets on the left and right of the velocity vector 14. The beam from the radar transmitter impinges upon surface of the earth. The radar signal is reflected back to the aircraft 10. Doppler shift will be present in the reflected signal with each doppler shift corresponding to a specific path along the surface of the earth. The area between two typical isodops I and I1 is shown as a shaded area in FIG. 1.

More specifically, it can be shown that all points of constant doppler frequency shift form a hyperbola, called an isodop, along the surface of the earth, two typical isodops being identified as I and I1 in FIG. 1. Assuming that the angle between the points defining an isodop I and the velocity vector 14 of the aircraft 10 is identified as an angle $\psi$, the distance between the aircraft 10 and the point of interest is identified by a distance R and the height of the aircraft above the earth is identified as a height h, any point on the the isodop can be identified by x, y coordinates with $$y = R \cosine \psi$$

$$x = \sqrt{R^2 \sin^2 \psi - h^2}.$$

In processing the doppler data, the mapping information is generated using "isodops" defined in this manner. This means that if the data is to be displayed on a CRT or other raster type display device in its correct geometrical relationship that the scanning for the raster must be non-linear as described by the above formula for the x and y coordinates. The area between two typical isodops, I and I1 is indicated by the shaded area in FIG. 1.

Figure 2:
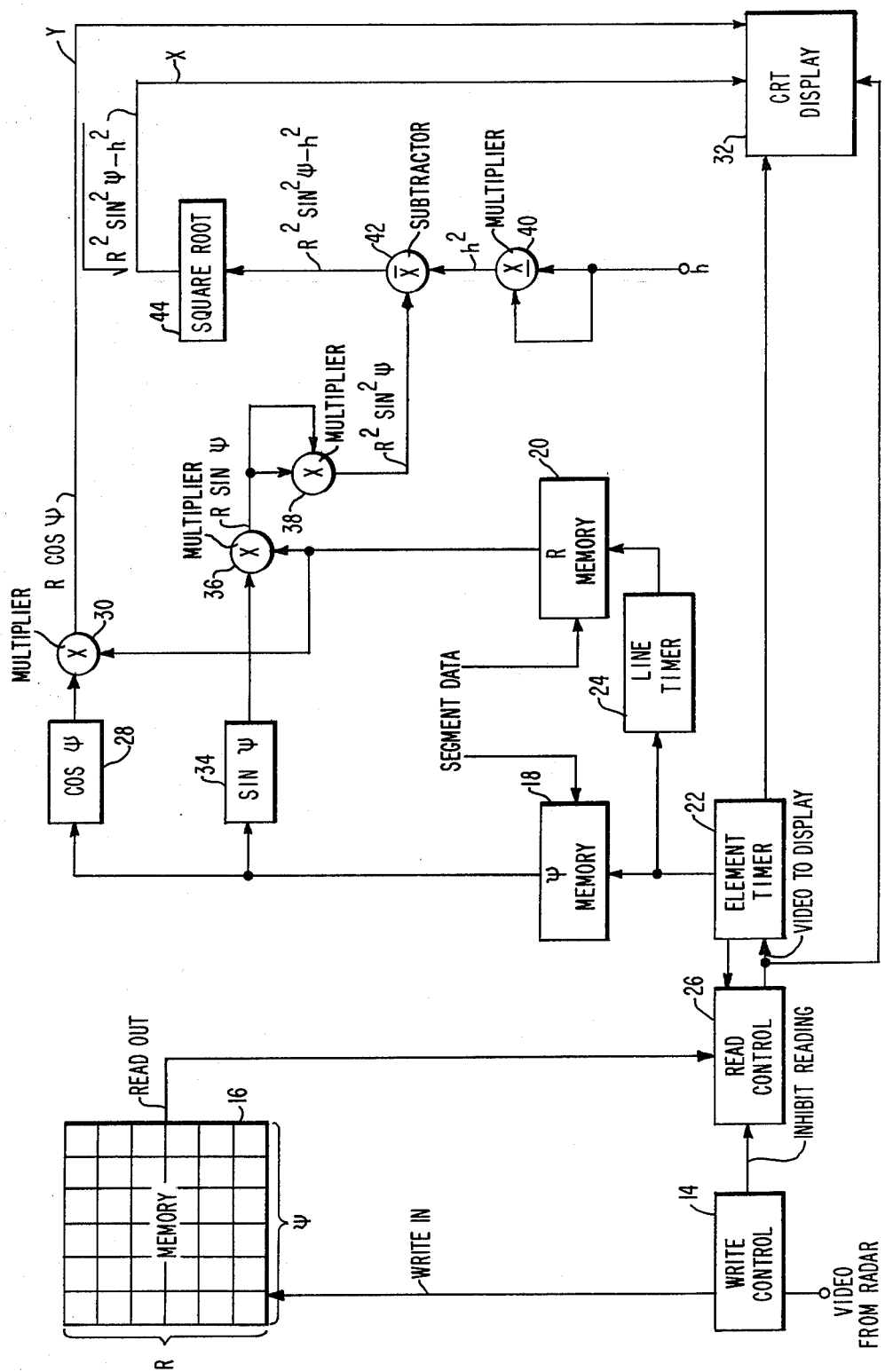
FIG. 2 is a block diagram of the preferred embodiment of the invention.

FIG. 2 is a block diagram of the display system comprising the preferred embodiment of the invention. The video data in digital format from the doppler radar system is coupled as an input signal to a write control circuit 14. This video data is in the format of all of the range elements for a constant angle $\psi$ and is stored in a memory 16 on an interleaved basis. By interleaved it is meant that when the data from the radar is available it is written in the memory in between read cycles of the memory.

The doppler radar system also provides to the display system angle and distance information to select the segment of the scan which is to be displayed. This segment data is provided in terms of angle $\psi$ and the associated distance R. Thus, any segment to be (mapped) displayed can be uniquely identified as lying between two angles ($\psi$ and $\psi 1$, for example) and two distances (R and R1, for example). In this segment, a specific value of $\psi$ and $R_S$ will describe a resolution element in the raster. A single value of $R_S$ will describe an arc of a circle on which all values of $\psi$ lie. A single value of $\psi$ will describe a segment of a hyperbola on which all values of $R_S$ lie. The display raster can therefore scan along lines of either constant $R_S$ or $\psi$. For a general solution to the problem, the preferred embodiment describes scanning along lines of constant $R_S$, primarily because of esthetic considerations of the final displayed image. Selecting the segment to be displayed, as described above permits all or any portion of the surface covered by the radar system to be displayed in its true geometrical relationship.

For the display system to function as described above, the radar system stores in a memory 18 signals (segment data) specifying the values of the angle $\psi$ corresponding to the segment to be mapped. Similarly, the doppler radar system also stores in a second memory 20 signals (segment data) which specify the ranges R corresponding to the segment to be mapped. Thus, stored in the two memories 18 and 20 is all the data necessary to uniquely identify an area of the earth to be mapped and is defined by the range signals and the angle signals. Since the area being mapped is defined in terms of angle and distance with respect to a moving aircraft, the area actually mapped will change as the position of the aircraft 10 changes.

The basic timing for the display is controlled by an element timer 22. Basically this timer initiates a read cycle of the memory 18 to generate at the output of this memory a digital signal which defines the angle $\psi$ corresponding to the line of the raster to be generated. The timer element 22 also initiates a line timer 24 which causes a digital signal which specifies the corresponding value of the range R to be read from the second digital memory 20. Element timer 22 also initiates a read control 26 which causes the video signals corresponding to the current line of the raster to be read from the memory 16. Since the system scans along constant range lines with a variable angle, a plurality of values or angle $\psi$ will be read for each range. It should also be pointed out that memory 16 is what is called a "corner turn" memory. Specifically, this means that the data is written into memory 16 by the write control 14 in a format in which all the range elements for a constant $\psi$ angle are written in. However, on read out all of the $\psi$ elements for a constant range are read. Memories functioning in this fashion are well known in the art.

The digital signals identifying the angle $\psi$ is coupled to the input of a cosine generator 28. This generates at the output a signal corresponding to the cosine of $\psi$. A digital signal specifying the range is read from memory 20. This signal is coupled as a first input signal to a multiplier 30. The second input to the multiplier 30 is the cosine $\psi$ signal. The output signal of multiplier 30 is the product of the range and the cosine of the angle $\psi$. As previously discussed, this is the mathematical formula for the y deflection signal. This number (signal) is coupled to the input of a CRT display 32 causing the beam on the display to be deflected in the Y direction in accordance with this mathematical function.

The digital signal corresponding to the angle $\psi$ is also coupled as an input to a sine generator 34 to generate a digital signal equal to the sine of $\psi$ at the output of this circuit. The sine of $\psi$ along with a signal specifying the corresponding range are coupled to the inputs of a second multiplier 36 to generate at the output of this multiplier a digital signal corresponding to the product of the range the sine of angle $\psi$. This value is squared by a second multiplier 38 to generate $R^2 \sin^2 \psi$.

A digital signal corresponding to the height (h) of the aircraft 10 above the earth is coupled to the input of a multiplier 40. Multiplier 40 squares this signal to generate at its output a signal corresponding to $h^2$. The digital signals corresponding to the value of $R^2 \sin^2 \psi$ and the $h^2$ are coupled as inputs to a subtractor 42 to generate at a signal corresponding to $R^2 \sin^2 \psi - h^2$. This signal is coupled to the input of a square root extractor 44 to generate at the output of this circuit a signal corresponding to the square root of $R^2 \sin^2 \psi - h^2$. This signal is coupled to the CRT 32 to deflect the beam in the X direction.

The digital signals specifying the values of the angle $\psi$ and the range R for each line are sequentially read and processed as described above to complete the raster. When all of the signals specifying the desired values for the range R and the angles, 104 and 104 1, have been read and processed as described above, the cycle is repeated. Coupling the x and y deflection signals described above to the CRT 32 completes the raster generation on the CRT.

For each scan line of the raster the read control circuit 26 initiates the reading of the corresponding video signal from the memory 16. This video signal is coupled to the CRT 32 to complete the mapping function.

As can be seen from the above discussion the scan raster on the CRT 32 is non-linear and has precisely the format necessary to generate a geometrically true display (map) within the scan range of the associated doppler radar system.

The above mapping system has also been found to be useable with radar systems utilizing electronically steerable antennas for real beam ground mapping. It has been found experimentally, and in preliminary mathematical analysis, that such systems also map along hyperbolas, primarily because of the change in the effective cross section of the mechanically fixed antenna as it electronically scans. The resultant azimuth returns come from hyperbola shaped lines on the ground. In this case, however, the aircraft direction shown in FIG. 1 changes to the congruent with the X axis instead of the Y axis as for doppler mapping. In the preferred embodiment, the only necessary change is to switch the X and Y deflection signals to the display: i.e., the X signal goes to the Y input of the display and the Y signal goes to the X input of the display.

A radar system with an electronically steerable antenna performing both doppler and real beam ground mapping can be accommodated by simply placing a reversing double pole double throw switch in the path of the two deflection signals to the display. In one position the embodiment will display doppler maps and in the other, real beam maps.

The mathematical functions indicated in FIG. 2 were implemented, in the experimental model, using standard commercially available digital integrated circuits. A microprocessor could also be used to implement these functions. Analog circuits are also useable. In any case, the system can be implemented by one skilled in the art using commercially available circuits and techniques.

I claim:

1. A system for displaying data using a non-linear raster comprising
    (1) memory means for storing video data to be displayed;
    (2) first means for reading said stored video data to generate a video data signal;
    (3) timer means for initiating said raster;
    (4) first storage means for storing first non-linear scan parameters;
    (5) second storage means for storing second non-linear scan parameters;
    (6) second means for reading said first and second non-linear scan parameters from said first and said second storage means and for processing said first and second non-linear scan parameters, to generate non-linear x and y deflection signals; and
    (7) display means responsive to said x and y deflection signals and said video data signal to display said video data signal using a non-linear raster.

2. A system for displaying data using a nonlinear scan raster in accordance with claim 1 wherein said means for reading and processing said non-linear scan parameters, includes arithmatic circuitry for generating hyperbolic scanning signals.

3. A system for displaying doppler radar video data using a non-linear raster in accordance with claim 2 wherein said memory means for storing data to be displayed includes circuitry for storing said doppler radar video data in a constant angle variable range format.

4. A non-linear raster generator comprising:
(a) first memory means for storing data specifying a first set of parameters to be used to generate deflection signals to produce scan lines of said raster;
(b) second memory means for storing data specifying a second set of parameters to be used to generate deflection signals to produce scan lines of said raster;
(c) means for selectively reading data from said first and second memory means in a predetermined sequence to produce a first signal related to a first scan parameter and second signal related to a second scan parameter, including
(d) arithmatic circuitry responsive to said first and second signals to produce first and second non-linear deflection signals.

* * * * *